United States Patent [19]

Tuckey

[11] Patent Number: 4,893,647

[45] Date of Patent: * Jan. 16, 1990

[54] IN-TANK FUEL RESERVOIR WITH RESERVOIR FUEL LEVEL CONTROL

[75] Inventor: Charles H. Tuckey, Cass City, Mich.

[73] Assignee: Walbro Corporation, Cass City, Mich.

[*] Notice: The portion of the term of this patent subsequent to Feb. 28, 2006 has been disclaimed.

[21] Appl. No.: 314,878

[22] Filed: Feb. 24, 1989

Related U.S. Application Data

[60] Division of Ser. No. 153,316, Feb. 8, 1988, Pat. No. 4,831,990, which is a continuation-in-part of Ser. No. 49,537, May 14, 1987, Pat. No. 4,807,582, which is a continuation-in-part of Ser. No. 928,184, Nov. 7, 1986, Pat. No. 4,747,388.

[51] Int. Cl.⁴ .................. F16K 17/19; F02M 37/10
[52] U.S. Cl. ................................ 137/493; 123/514; 137/572; 137/576
[58] Field of Search ............... 123/514, 516; 137/510, 137/565, 572, 574, 575, 576, 493

[56] References Cited

U.S. PATENT DOCUMENTS

| | | | |
|---|---|---|---|
| 3,189,042 | 6/1965 | Kerley et al. | 137/510 X |
| 4,279,232 | 6/1981 | Schuster et al. | 123/516 |
| 4,546,750 | 10/1985 | Brunell et al. | 123/514 |
| 4,672,937 | 6/1987 | Fales et al. | 123/516 |
| 4,807,585 | 2/1989 | Tuckey | 137/572 X |

Primary Examiner—Stephen M. Hepperle
Attorney, Agent, or Firm—Barnes, Kisselle, Raisch, Choate, Whittemore & Hulbert

[57] ABSTRACT

A fuel delivery system for automobile engine and like applications in which a canister is positioned within a fuel tank and has an open layer end and an internal wall spaced from the lower canister end for dividing the canister into upper and lower chambers. An electric fuel pump is carried by the canister wall within the upper chamber and has an inlet coupled through the wall to the lower chamber. The pump outlet feeds fuel under pressure to an engine, and excess fuel is returned to the upper chamber which thus forms a fuel reservoir. A valve is responsive to fuel level in the upper chamber for selectively feeding fuel from the upper reservoir chamber to the lower chamber, and then to the pump inlet, when fuel level in the upper chamber approaches maximum reservoir capacity.

4 Claims, 3 Drawing Sheets

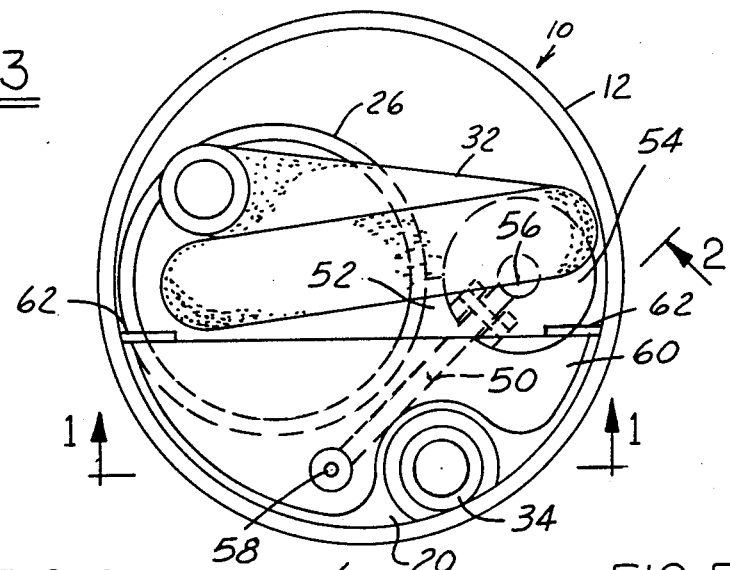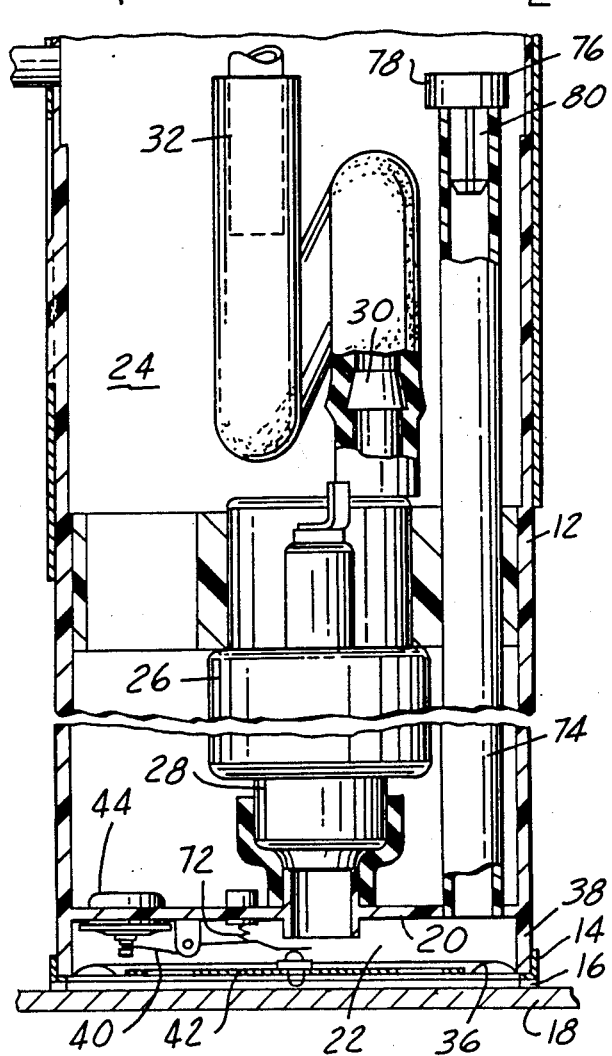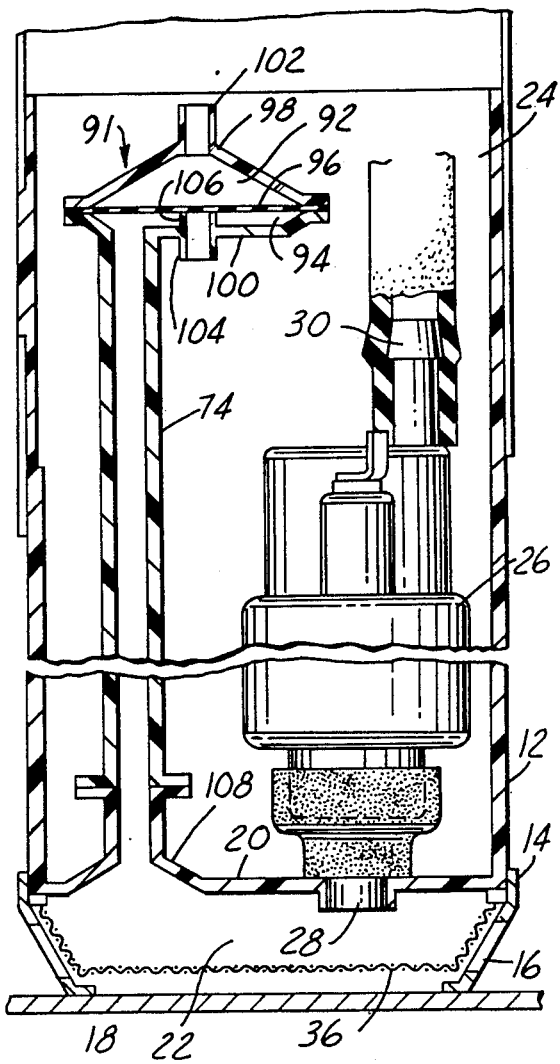

IN-TANK FUEL RESERVOIR WITH RESERVOIR FUEL LEVEL CONTROL

This application is a division of application Ser. No. 153,316 filed Feb. 8, 1988, now U.S. Pat. No. 4,831,990, which is a continuation-in-part of application Ser. No. 49,537 filed May 14, 1987, now U.S. Pat. No. 4,807,582, which is a continuation-in-part of application Ser. No. 928,184 filed Nov. 7, 1986, now U.S. Pat. No. 4,747,388.

The present invention is directed to fuel delivery systems for automotive engine and like applications, and more particularly to a fuel pump module which includes an electric fuel pump mounted within an in-tank reservoir as disclosed in the above-identified parent and grandparent applications.

The above-identified parent and grandparent applications disclose fuel delivery systems for automotive vehicles which include a fuel canister positioned within a fuel tank and containing an electric fuel pump. The canister has an open end positioned at the bottom of the fuel tank, and an internal wall spaced from the open end to define separate upper and lower fuel canister chambers. The fuel pump is positioned in the upper chamber, has an inlet coupled to the lower chamber for drawing fuel therefrom, and an outlet for feeding fuel under pressure to an engine or the like. A pressure regulator valve bypasses excess fuel which is returned to the upper canister chamber, which thus forms a fuel reservoir surrounding the fuel pump. A filter diaphragm spans the open lower end of the canister and is characterized by permitting free flow of liquid fuel therethrough, while being closed by surface tension of liquid fuel to restrict passage of air therethrough. The diaphragm is coupled by a lever to a valve in the canister wall so that, in the absence of fuel at the canister end, the diaphragm is drawn into the lower chamber by fuel pump suction and opens the valve, so that fuel is made available to the pump inlet from the upper chamber reservoir.

Although the fuel delivery systems so disclosed in the parent and grandparent applications have enjoyed substantial acceptance and success, improvements remain desirable. In particular, the excess fuel returned from the engine is hot and, when permitted to overflow from the canister reservoir into the main fuel tank, tends to heat the fuel and thereby increase vapor pressure within the tank. One object of the present invention, therefore, is to provide a mechanism for minimizing overflow of hot fuel from the fuel reservoir to the fuel tank, and thereby help reduce heating of fuel in the tank and generation of vapors within the fuel delivery system. Another object of the invention is to provide a mechanism for venting any vapors trapped within the lower canister chamber adjacent to the fuel pump inlet, and thereby help prevent delivery thereof to the pump inlet and consequent potential vapor lock of the fuel delivery system.

In accordance with one important aspect of the present invention, a fuel delivery system for automotive engine and like applications comprises a canister for positioning within a fuel tank and having a lower end with a fuel opening and an internal wall spaced from such lower end dividing the canister into upper and lower chambers. An electric fuel pump is positioned within the upper chamber, has an inlet coupled to the lower chamber through the canister wall and an outlet for feeding fuel under pressure to an engine. Excess fuel is returned from the engine to the upper chamber, which thus forms a fuel reservoir. A valve is responsive to fuel level in the upper chamber for selectively feeding fuel from the upper chamber to the lower chamber when fuel level in the upper chamber approaches maximum capacity. Thus, when the upper chamber is filled with fuel returned from the engine, such hot fuel is fed through the level-responsive valve to the pump inlet and returned to the engine. In preferred embodiments of the invention, the level-responsive valve comprises a float either positioned at the upper end of a standpipe opening through the canister wall into the lower chamber, or coupled to the diaphragm valve for opening the diaphragm valve independently of the diaphragm itself.

In accordance with another aspect of the present invention, the level-responsive valve is positioned at the upper end of the standpipe and comprises a pressure diaphragm which normally blocks communication from the standpipe to the canister reservoir. That portion of the canister wall surrounding the lower standpipe opening slopes upwardly from the lower chamber for directing vapors from the lower chamber through the standpipe to the upper portion of the upper chamber. The diaphragm opens communication from the standpipe to the upper chamber either in response to vapor pressure within the standpipe or level of liquid fuel within the upper chamber surrounding the standpipe.

The invention, together with additional objects, features and advantages thereof, will be best understood from the following description, the appended claims and the accompanying drawings in which:

Figure 1:
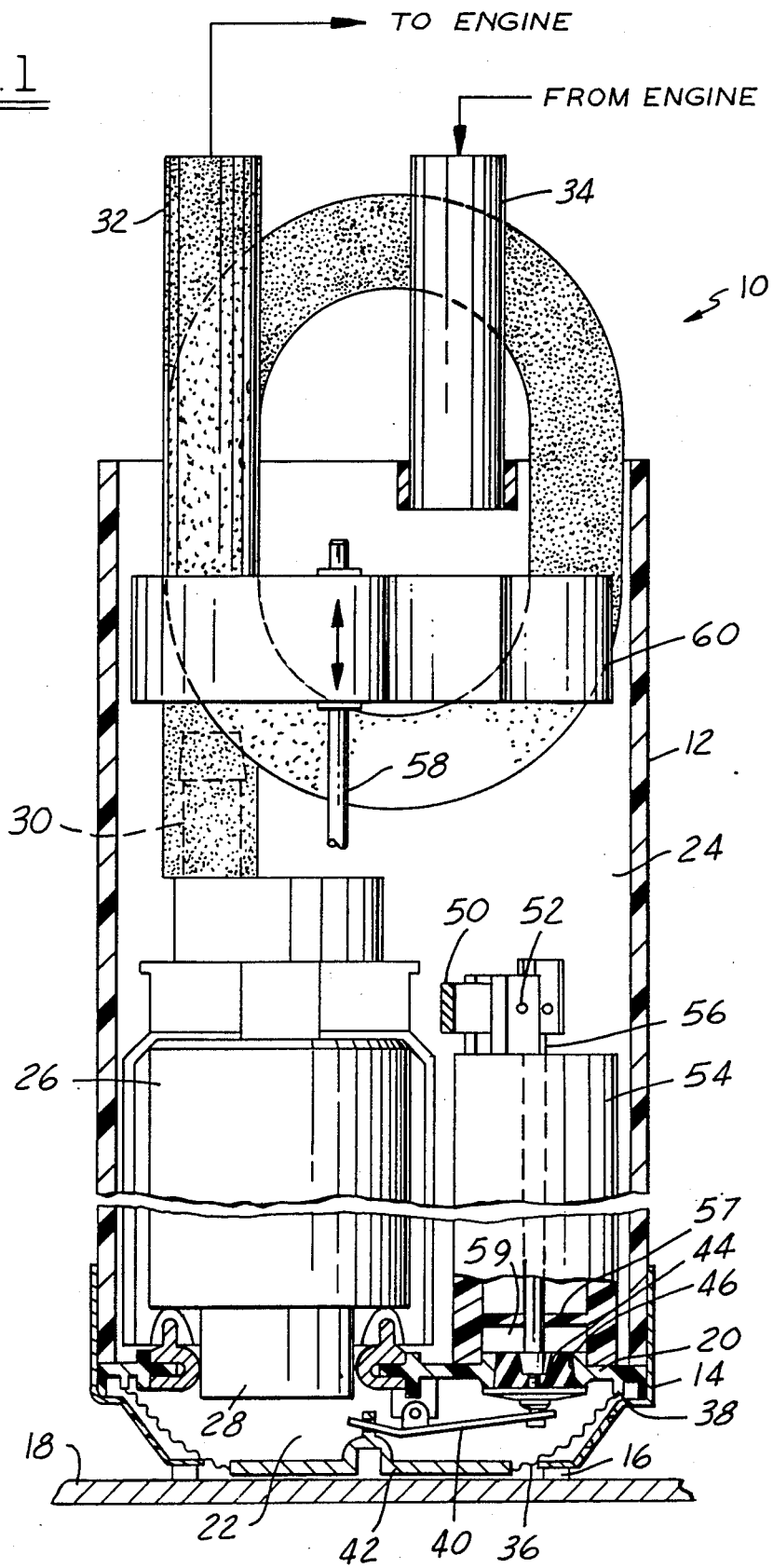
FIG. 1 is a fragmentary sectional view in side elevation of a fuel delivery module in accordance with a presently preferred embodiment of the invention.
Figure 2:
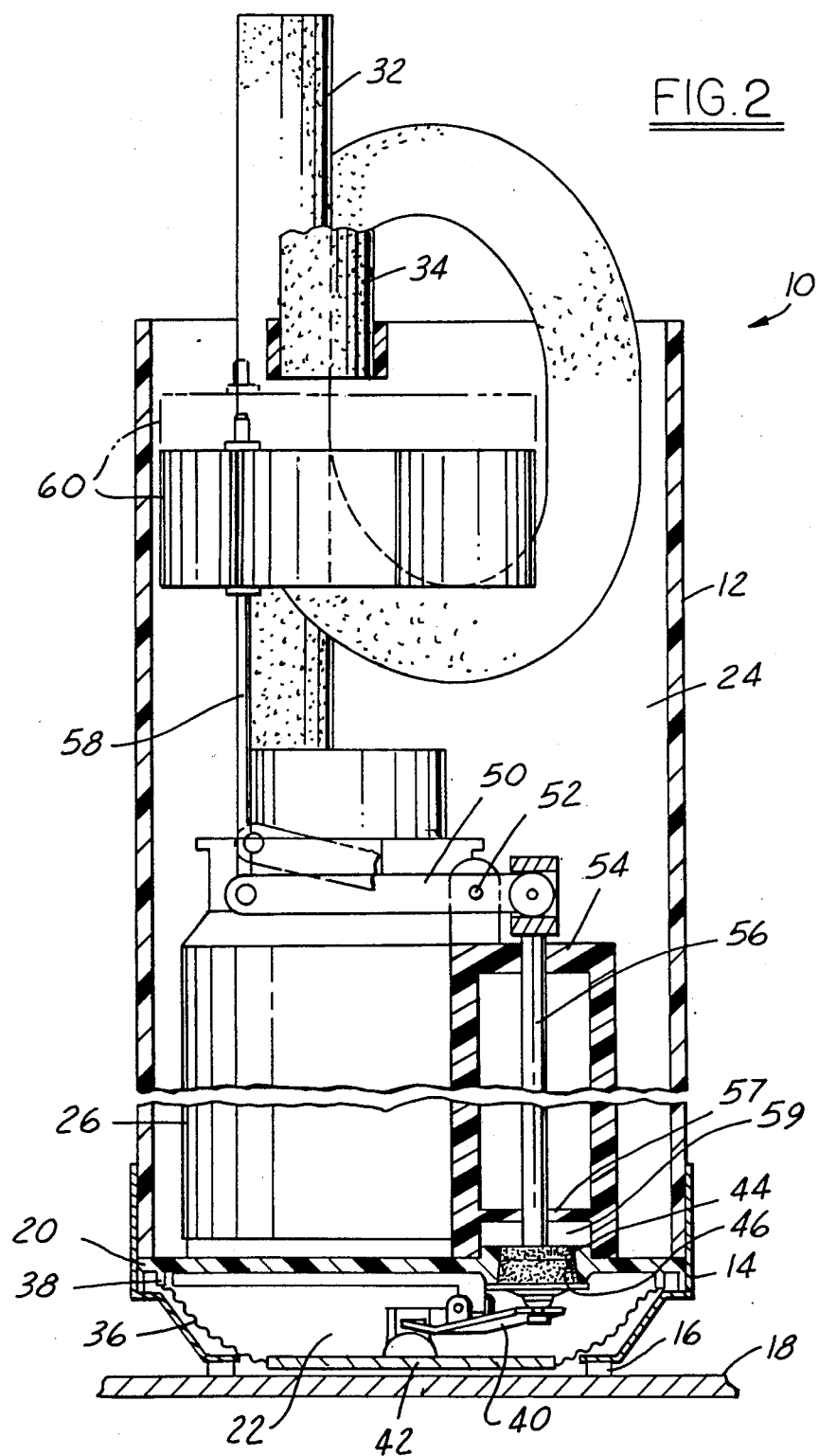
FIG. 2 is a fragmentary sectional view in side elevation of the fuel module illustrated in FIG. 1.

FIG. 3 is a plan view of the fuel module of FIGS. 1 and 2, FIGS. 1 and 2 being taken substantially along the respective lines 1—1 and 2—2 in FIG. 3; and FIGS. 4 and 5 are sectional views in side elevation of respective modified embodiments of the invention.

FIGS. 1–3 illustrate a fuel delivery module 10 in accordance with a presently preferred embodiment of the invention as comprising a substantially cylindrical canister 12 having an open top and bottom. A canister support 14 encircles the open lower edge of canister 12 and is adapted to rest on the bottom of a fuel tank 18. An internal wall 20 within canister 12 forms and separates a lower chamber 22 at the open bottom of canister 12 and an upper chamber 24. A circumferential opening 16 in support 14 admits fuel to lower chamber 22 from the surrounding fuel tank. An electric fuel pump 26 is positioned within upper chamber 24, and has an inlet 28 which extends through wall 20 to draw fuel from lower chamber 22 and an outlet 30 connected by a suitable fuel line 32 for delivering fuel to an engine. Excess fuel from the engine is returned through a line 34 to upper chamber 24.

A mesh filter 36 spans the open lower end of canister 12, being ultrasonically welded around its periphery to an annular shoulder 38 on wall 20. A lever 40 has a central portion pivotally mounted to wall 20 within lower chamber 22 and is coupled at one end to a web 42 centrally carried by filter 36. The opposing end of lever 40 is coupled to a valve element 44 positioned within an opening or passage 46 in wall 20. Filter 36 is characterized by permitting free passage of liquid fuel therethrough, while being closed by surface tension of liquid fuel to restrict passage of air therethrough. Thus, in the event of absence of fuel available through opening 16, suction pressure of pump 26 pulls filter 36 upwardly, with lever 40 thus moving valve 44 downwardly and thereby permitting flow of fuel from reservoir chamber 24 into lower chamber 22 and thence to pump inlet 28. On the other hand, as long as fuel is available at opening 16, valve element 44 is urged to the closed position illustrated in the drawings. To the extent thus far described, fuel module 10 is essentially similar to those disclosed in the above-identified parent and grandparent applications, to which reference may be had for further detailed discussion.

In accordance with the present invention, of which a preferred embodiment is illustrated in FIGS. 1-3, a lever 50 is mounted by a pivot pin 52 on a support column 54 within upper chamber 24 above wall opening 46 and valve element 44. One end of lever 50 is pivotally embraced by the upper end of a valve stem 56 which extends downwardly through column 54 to abut and engage valve element 44 in opposition to lever 40. The opposing end of lever 50 is pivotally coupled to a rod 58. Rod 58 extends upwardly from lever 50 and has float 60 mounted thereto. Float 60 may be of any suitable geometry, as illustrated in FIG. 3, and engages the flanges 62 which project inwardly from the wall of canister 12 for guiding motion of the float. Valve stem 56 is slidably guided through an aperture at the upper end of column 54 and through a septum 57 adjacent to the lower end of column 54. Openings 59 in column 54 permit free passage of fuel from chamber 24 to chamber 22 when valve 44 is open.

In operation, excess fuel returned from the engine through return line 34 enters reservoir chamber 24, and the fuel level therewithin gradually rises. When the fuel level within chamber 24 reaches float 60, which preferably is positioned adjacent to the upper edge of canister 12 and thus indicates approach of fuel level to maximum reservoir capacity, float 60 is buoyantly urged upwardly by the fuel from the position illustrated in solid lines in FIG. 2 toward that illustrated in phantom. Buoyant forces on float 60 are transmitted by lever 50 to urge stem 56 downwardly against valve 44 in opposition to the weight of filter 36 and web 42 within chamber 22. When the buoyant forces on float 60 are sufficient to overcome the weight of the filter and web, float 60 moves upwardly and valve 44 is moved downwardly, and fuel flows directly from chamber 24 to chamber 22 and thence to pump inlet 28 independently of availability of fuel at opening 16. Thus, hot return fuel is consumed in preference to fuel in the surrounding tank as long as reservoir chamber 24 remains full. If sufficient fuel is withdrawn from reservoir chamber 24 to return float 60 to the position illustrated in solid lines, valve 44 is correspondingly closed and fuel is drawn exclusively from the surrounding tank through opening 16. It will be appreciated, of course, that suction pressure on filter 36 in the absence of fuel at opening 16 must overcome the weight of float 60 and link 58 in order to open valve 44. If the quantity of fuel returned through line 34 exceeds that drawn from chamber 24 by pump 26, the excess overflows the open upper edge of canister 12 into fuel tank 18.

FIG. 4 illustrates a modified fuel module 70 in which reference numerals identical to those hereinabove discussed with reference to FIGS. 1-3 indicate correspondingly identical or equivalent elements. In the embodiment of FIG. 4, lever 40 is biased by a spring 72 against motion by filter 36 and web 42 as in the above-identified parent and grandparent applications. A hollow standpipe 74 is carried by wall 20 and has a lower end which opens through wall 20 into lower chamber 22. Standpipe 74 extends upwardly from wall 20 through chamber 24 to an upper end which is positioned at a height which corresponds to the maximum design capacity fuel level of reservoir chamber 24. A float 76 includes a cap 78 of suitable buoyant construction which normally rests upon and closes the upper end of standpipe 74. Fingers 80 integrally extend axially from cap 78 into standpipe 74 for guiding motion of float 76 with respect to the upper standpipe end while permitting free flow of liquid fuel into the standpipe when cap 78 is spaced from the standpipe end. Fingers 80 have an axial dimension which is greater than maximum travel of float 76 away from standpipe 74, so that float 76 will not disengage from standpipe 74 if canister 12 overfills. Thus, when fuel level within chamber 24 exceeds the height of the upper end of the standpipe, float 76 is buoyantly lifted from the upper standpipe end and fuel flows freely through standpipe 74 and wall 20 into lower chamber 22, and thence into pump inlet 28. When fuel level within chamber 24 is below the upper standpipe end, float 76 closes the standpipe and prevents entry of air.

FIG. 5 illustrates another modified embodiment 90 in which standpipe 74 terminates at its upper end in a chamber 91 which is divided into upper and lower sections 92,94 by a flexible diaphragm 96. Diaphragm 96 has its periphery captured by opposed segments 98,100 which form chamber 91. Upper chamber section 92 is vented by the port 102 to atmosphere within the fuel tank. A vent 104 in lower chamber segment 100 has an upstanding seat 106 normally resiliently engaged within segment 100 by the central portion of diaphragm 96 to close vent 104. Wall 20 includes a conical portion 108 surrounding the lower end of standpipe 74 which slopes or tapers upwardly into chamber 24 for directing any vapors which enter chamber 22 to and through standpipe 74. When vapor pressure within standpipe 74 is sufficient to overcome resiliency of diaphragm 96, diaphragm 96 is lifted from seat 106 and vapor passes through vent 104 to chamber 24. Likewise, when the level of fuel within chamber 24 reaches the level of diaphragm 96, static fuel pressure entering seat 106 overcomes resiliency of diaphragm 96 and feeds fuel directly from chamber 24 through standpipe 74 to chamber 22. It will be noted that chamber section 98 tapers upwardly and vent 102 extends upwardly therefrom to ensure that liquid fuel will overcome resiliency of diaphragm 96 and flow through standpipe 74 prior to entry through vent 102 into chamber 92.

What is claimed is:

1. A fuel delivery system for automobile engines and the like comprising: a canister for positioning within a fuel tank and having a lower end with an opening in communication with said fuel tank and an internal wall spaced from said lower end dividing said canister into upper and lower chambers, an electric fuel pump positioned within said canister having an inlet coupled to draw fuel solely from said lower chamber through said internal wall and an outlet for delivering fuel under pressure, means for returning excess fuel to said upper chamber, and means responsive to fuel level in said upper chamber for selectively feeding fuel from said upper chamber to said lower chamber when fuel level in said upper chamber approaches maximum capacity of said upper chamber, said level responsive means comprising passage means in said internal wall and a standpipe extending from said passage to an upper end at a position corresponding to maximum capacity fuel level in said upper chamber, and further comprising pressure valve means carried at said upper end of said standpipe.

2. A fuel delivery system for automobile engines and the like comprising: a canister for positioning within an fuel tank and having a lower end with an opening in communication with said fuel tank and an internal wall spaced rom said lower end dividing said canister into upper and lower chambers, an electric fuel pump positioned within said canister having an inlet coupled to draw fuel solely from said lower chamber through said internal wall and an outlet for delivering fuel under pressure, means for returning excess fuel to said upper chamber, and means responsive to fuel level in said upper chamber for selectively feeding fuel from upper chamber to said lower chamber when fuel level in said upper chamber approaches maximum capacity of said upper chamber, said level responsive means comprising passage means in said internal wall and a standpipe extending from said passage to an upper end at a position corresponding to maximum capacity fuel level in said upper chamber, and further comprising pressure valve means carried at said upper end of said standpipe, said pressure valve means comprising means at said upper end of said standpipe forming a valve chamber, a resilient diaphragm extending across said valve chamber and dividing said valve chamber into upper and lower valve chamber segments, said standpipe opening into said lower valve chamber segment, means venting said upper valve chamber segment to atmosphere, and vent means in said lower valve chamber segment having a seat opposed to said diaphragm, said diaphragm normally resiliently seating against said seat.

3. The system set forth in claim 2 wherein said wall includes a conical portion surrounding said passage for venting vapors in said lower chamber to said standpipe.

4. A fuel delivery system for automotive engines and the like comprising: a canister for positioning within a fuel tank and having a lower end with an opening and an internal wall spaced from said lower end dividing said canister into upper and lower chambers, an electric fuel pump in said upper chamber having an inlet coupled through said wall to said lower chamber and an outlet for delivering fuel under pressure, means forming a passage in said wall, at least a portion of said wall surrounding said passage sloping upwardly into said upper chamber, and a standpipe extending from said passage into an upper portion of said upper chamber for venting vapors from said lower chamber into said upper portion of said upper chamber, and further comprising valve means carried at an upper end of said standpipe, said valve means comprising means at said upper end of said standpipe forming a valve chamber, a resilient diaphragm extending across said valve chamber and dividing said valve chamber into upper and lower valve chamber segments, said standpipe opening into said lower valve chamber segment, means venting said upper valve chamber segment to atmosphere, and vent means in said lower valve chamber segment having a seat opposed to said diaphragm, said diaphragm normally resiliently seating against said seat.

* * * * *